Jan. 30, 1934.   A. G. LUNDIN   1,945,053
CLUTCH FOR TAPPING ATTACHMENTS
Filed May 9, 1933
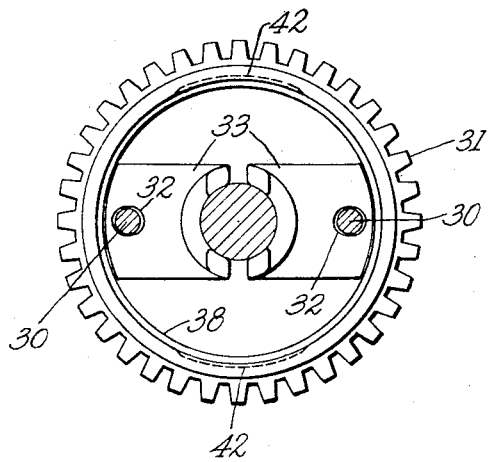
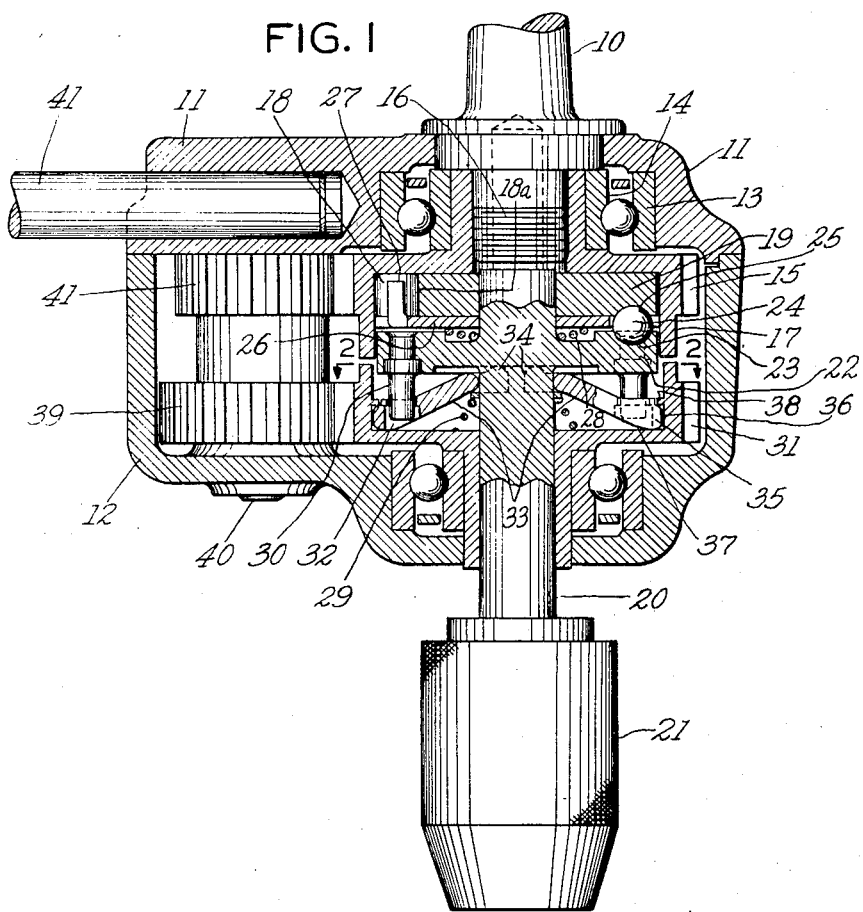
INVENTOR
Axel G. Lundin
BY Sydney Prescott
ATTORNEY Patented Jan. 30, 1934

1,945,053

UNITED STATES PATENT OFFICE 1,945,053

CLUTCH FOR TAPPING ATTACHMENTS

Axel G. Lundin, Blairstown, N. J., assignor to American Machine & Foundry Company, a corporation of New Jersey Application May 9, 1933. Serial No. 670,184

4 Claims. (Cl. 10—135)

This invention relates to tool operating attachments for drilling machines such as drill presses and the like, designed to prevent breakage and provide more convenient operation of the tools, and particularly relates to tap chucks for attachment to drilling machines, similar to the tap chuck disclosed in the patent to A. G. Lundin et al., No. 1,915,542, granted June 27, 1933.

In order to prevent breakage when the tap strikes the bottom of a hole, tapping attachments have in the past been provided with clutches which release under overload but these have commonly been of the type in which one set of teeth or projections on the driving member are spring pressed into another set of teeth or recesses on the driven member. Clutches of that type have been noisy and of short life, and the overload under which they release has commonly been the same whether a large or small tool was used. They have also required a rather large movement to release the teeth or projections to permit them to pass out of the notches or recesses in which they engaged and in some cases some effort was required to reengage the teeth or projections.

It is one of the main objects of the invention to produce a tap chuck which eliminates or substantially reduces these objections to prior devices of this type.

Another object is to produce a tap chuck of this type which is particularly simple and compact, and relatively inexpensive to manufacture.

A further object is to provide an improved reversing mechanism to permit almost instantaneous reversing of the direction of rotation of the tool when it strikes bottom and to render said reversing mechanism simpler and longer wearing than prior mechanisms and capable of smoother and more secure engagement and quicker control upon pulling up on the driving shank.

With these and other objects not specifically mentioned in view, the invention consists in certain constructions and combinations which will be hereinafter fully descrbed and then specifically set forth in the claims hereunto appended.

In the accompanying drawing, which forms a part of this specification and in which like characters of reference indicate the same or like parts, Fig. 1 is a sectional side elevation of the improved tap chuck; and Fig. 2 is a detail sectional view taken from the line 2—2 of Fig. 1.

In carrying the invention into effect there is provided a driving shank, a tool carrying driven spindle, fully releasable mechanism connecting said shank and spindle to drive said spindle in one direction to feed the tool into the work, an overload responsive device on said spindle adapted to release said mechanism when there is an overload on the spindle, gearing driven from said shank for driving said spindle in the opposite direction to withdraw the tool from the work, and a frictional reversing clutch on said spindle for operatively connecting said gearing to the spindle to withdraw the tool from the work. In the best forms of construction contemplated said gearing includes a flanged gear loosely mounted on the spindle, and said reversing clutch includes a head integral with the driven spindle, a pair of toggle arms interposed between said head and flanged gear, a spring interposed between said arms and gear to press the inner ends of the arms against said head, the interior of the flange on said gear being provided with an annular recess adapted to receive the outer ends of said arms and frictionally grip the same when the flanged gear is moved toward said head, and said annular recess being provided with dimetrically opposite depressions adapted to receive and positively grip the outer ends of said arms whenever they slip in said recess due to an overload on the spindle during the withdrawal of the tool from the work. These various means and parts may be widely varied in construction within the scope of the claims, for the particular device selected to illustrate the invention is but one of many possible concrete embodiments of the same. The invention, therefore, is not to be restricted to the specific construction shown and described.

Referring now to the drawing, a driving spindle or shank 10 designed to fit the usual tapered socket of a drill press or other drilling machine, is rotatably mounted in the cover 11 of a housing 12, by means of suitable ball bearings 13 engaging a journal bushing 14 on the hub of a gear 15 rigidly secured to a stud 16 on the driving shank 10.

The gear 15 has a depending flange 17 which forms a driving clutch part, the inner face of the flange being positioned to be engaged by jam elements, such as the spring-pressed rollers 18, which are located in tapered cam notches 18a (see Fig. 1) in a disk 19 forming a driven clutch part. When the driving shank is rotated in one direction relative to the disk 19 to feed the tool to the work, the rollers jam against the inner face of flange 17 and transmit driving rotation to the disk.

The disk 19 drives the driven spindle 20, which is journaled in ball bearings in the housing 12 and carries at its outer end the tool carrying chuck 21, through a head or flange 22 integral with the driven spindle. This flange is provided with spherical recesses 23 which receive driving balls 24 which engage at their opposite sides similar recesses 25 in the disk 19. The depth of these recesses is proportioned so that downward pressure on the driving spindle and thus on the balls produces a certain driving effect on the spindle and only permits relative movement of the disk and the flange after a predetermined overload stress has been reached on the spindle, such for instance as that which results when a tap strikes bottom in a hole being tapped. It will be seen that if the downward pressure on the driving shank is increased to increase the pressure on the tool in the chuck, then the load carried by the spindle before the disk and flange yield relatively under the load will be increased so that the same attachment will work satisfactorily for both large and small taps; because the greater downward pressure required by the large tap will also cause the overload responsive mechanism formed by the disk flange and balls to yield, through the balls riding out of the bottom of the recesses by riding up the sides of the recesses in the flange 22, only at a correspondingly higher overload. However, the balls never leave the recesses; the balls merely permit relative rotary displacement of the flange 22 and disk 19 when the latter is displaced axially due to an overload stress on the tool.

This overload responsive device controls the driving engagement of the rollers 18 through a disk 26 having depending ears engaging notches in the head or flange 22 and having upwardly extending ears 27 extending into the cam notches of disk 19 in which the rollers or jam elements are located. Thus when there is relative rotary movement of the flange 22 with respect to the disk 19, the upstanding ears or prongs 27 will be moved against the rollers in a direction which will force the rollers out of driving engagement in the tapered cam notches, completely releasing this positive clutch, which will stay released until the driving spindle slows up or until greater pressure is placed on the driving shank to recenter the driving balls 24 in the bottom of the recesses whereupon the rollers 18 will be free to move into driving engagement again.

A spring 28 holds the disk 26 in its uppermost position, the disk serving to support the rollers 18 in the cam notches thereby preventing them from cocking or becoming tilted as they might when the driven spindle 20 with its flange 22 is moved away from the drive spindle and gear 15, as will presently be described. The overload responsive device described above is substantially similar to that disclosed in the copending application referred to above.

Suitable reversing mechanism is put into operation by the operator pulling upon the driving shank after the tap or tool has struck bottom and caused the overload responsive device to stop the rotation of the tool. When the driving shank is thus pulled up the flange 22 on the driven spindle is held down against the action of spring 29 and thereby causes the coupling of the reversing clutch. This clutch consists of driving pins 30 on the flange 22 and a driven flanged gear 31 loosely mounted on the driven spindle 20, the depending ends of pins 30 loosely fitting openings 32 in the toggle arms 33. The upwardly extending nose portions 34 of the arms 33 are normally pressed against the under face of flange 22 by the action of spring 29, and while in this position the ends 35 of the arms are out of engagement with the annular groove 36 provided in the flanged gear 31. When the driving shank is pulled up with the tap in a hole in the work, the housing 12 together with the gear 31 is pulled up towards the flange 22, the inner face of the gear 31 pressing on the rounded portions 37 of the arms 33, and causing their ends 35 to engage with the annular groove 36 and also to bear against the annular ledge 38, thus connecting the gear 31 to the driven spindle carrying the tool. This gear is constantly driven in the opposite direction from gear 15 by a pinion 39 on a shaft 40 at the upper end of which is a second gear 41 integral with gear 39, the gear 41 meshing with a gear (not shown) which is driven by the gear 15. This arrangement of gears is the same as that disclosed in the copending application to which reference is made for a complete disclosure of the same.

If there is an overload on the tap while it is being withdrawn from the work the slipping of the arms 33 due to the overload brings the same into engagement with diametrically opposite depressions 42 provided in the groove 36, which are made slightly wider than the arms 33. The arms when snapped into the depressions 42 permits the flange 22 to produce a greater pressure on the arms 33 thus assuring a more positive gripping action sufficient to overcome the obstruction or other cause of the overload during the withdrawal of the tool.

The tension of spring 29 is preferably made a little more than sufficient to overcome the tendency of the weight of the parts on the driven spindle to press the arms into engagement with the annular groove 36. The tension of the spring 29 need be no more than enough to urge the disk 26 against the disk 19 in opposition to weight of the driven spindle and tool thereof so that a very slight load or even friction of the parts is sufficient to release the clutch when there is no pressure on the tool. Any conventional handle 41 serves to hold the device against rotation as pressure is applied to the shank.

What is claimed is:

1. In a chuck, the combination with a driving shank, of a tool carrying driven spindle, fully releasable mechanism connecting said shank and spindle to drive said spindle in one direction to feed the tool into the work, an overload responsive device on said spindle adapted to release said mechanism when there is an overload on the spindle, gearing driven from said shank for driving said spindle in the opposite direction to withdraw the tool from the work, and a frictional reversing clutch on said spindle for operatively connecting said gearing to the spindle to withdraw the tool from the work, said reversing clutch including means for frictionally connecting said gearing to the spindle whenever an overload on the spindle during the withdrawal of the tool from the work causes the reversing clutch to slip.

2. In a chuck, the combination, with a driving shank, of a tool carrying driven spindle, fully releasable mechanism connecting said shank and spindle to drive the spindle in one direction to feed the tool into the work, an overload responsive device on said spindle adapted to release said mechanism when there is an overload on the spindle, gearing driven from said shank for driving said spindle in the opposite direction to withdraw the tool from the work, and a frictional reversing clutch for operatively connecting said gearing to the spindle to withdraw the tool from the work, said gearing including a driven flanged gear loosely mounted on said spindle, and said reversing clutch including a head integral with the driven spindle, a pair of toggle arms interposed between said head and flanged gear, a spring interposed between said arms and gear to press the inner ends of the arms against said head, the interior of the flange on said gear being provided with an annular recess adapted to receive the outer ends of said arms and frictionally grip the same when the flanged gear is moved towards said head, and said annular recess being provided with diametrically opposite depressions adapted to receive and frictionally grip the outer ends of said arms whenever they slip in said recess due to an overload on the spindle during the withdrawal of the tool from the work.

3. The combination with a driving shank, of a tool carrying driven spindle, gearing driven from said shank for driving said spindle, and a frictional clutch for operatively connecting said gearing to the spindle to reverse said spindle, said clutch including means for frictionally connecting said gearing to the spindle whenever an overload on the spindle causes the clutch to slip.

4. The combination with a driving shank, of a tool carrying driven spindle, gearing driven from said shank for driving said spindle, and a frictional clutch for operatively connecting said gearing to the spindle, said gearing including a driven flanged gear loosely mounted on said spindle, and said clutch including a head integral with said spindle, a pair of toggle arms interposed between said head and flanged gear, a spring interposed between said arms and gear to press the inner ends of the arms against said head, the interior of the flange on said gear being provided with an annular recess adapted to receive the outer ends of said arms and frictionally grip the same when the flanged gear is moved towards said head, and said annular recess being provided with diametrically opposite depressions adapted to receive and frictionally grip the outer ends of said arms whenever they slip in said recess due to an overload on the spindle.

AXEL G. LUNDIN.